United States Patent

[11] 3,604,779

| [72] | Inventor | Liebmann Reinhold |
| | | Oberkochen/Wurttemberg, Germany |
| [21] | Appl. No. | 77,028 |
| [22] | Filed | Sept. 30, 1970 |
| [45] | Patented | Sept. 14, 1971 |
| [73] | Assignee | Carl Zeiss-Stiftung |
| | | Wurttemberg, Germany |
| [32] | Priority | May 6, 1968 |
| [33] | | Austria |
| [31] | | 4332/68 |
| | | Continuation-in-part of application Ser. No. 818,494, Apr. 23, 1969, now abandoned. |

[54] BINOCULAR FIELD GLASS WITH DOUBLE JOINT
1 Claim, 8 Drawing Figs.

[52] U.S. Cl............................................. 350/75, 350/36
[51] Int. Cl.............................................. G02b 7/12
[50] Field of Search............................. 350/70–76, 36

[56] References Cited
UNITED STATES PATENTS
| 2,483,289 | 9/1949 | Martin........................ | 350/307 |
| 3,014,405 | 12/1961 | Swikart...................... | 350/146 |

FOREIGN PATENTS
| 178,415 | 1/1923 | Great Britain............... | 350/70 |
| 413,049 | 5/1910 | France....................... | 350/70 |

Primary Examiner—David H. Rubin
Attorney—Singer, Stern & Carlberg

ABSTRACT: A binocular field glass in which the two individual telescopes are connected with each other by a bridge forming a double joint and made of two members with oppositely disposed flat faces, each having spaced parallel semicircular precision finished recesses therein to receive two hinge pins accurately parallel with the axes of the telescopes. A single centrally arranged threaded connection holds the two bridge members together, whereby the walls of the recess frictionally engage the hinge pins.

Fig. 1
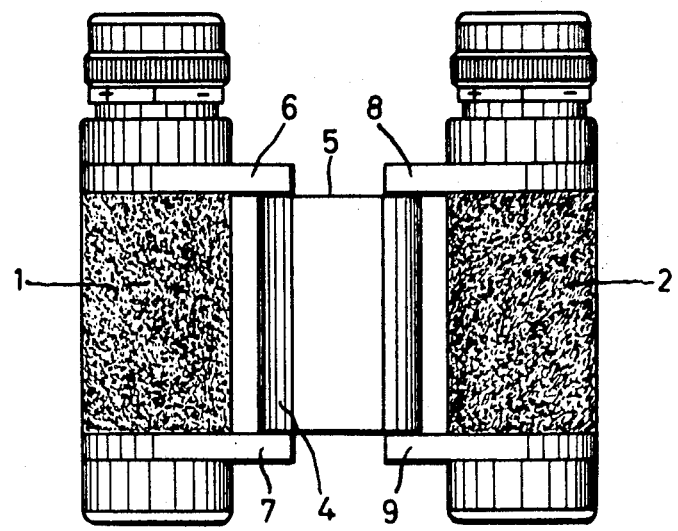
Fig. 2
Fig. 7
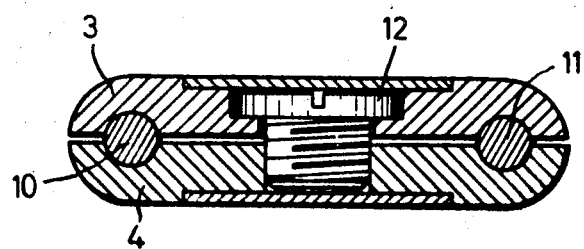

Fig. 3
Fig. 5
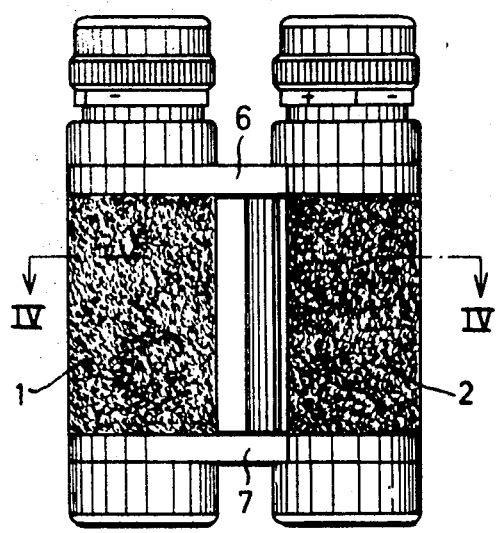
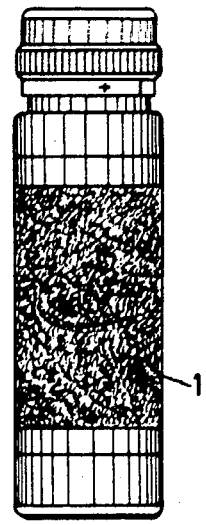
Fig. 4
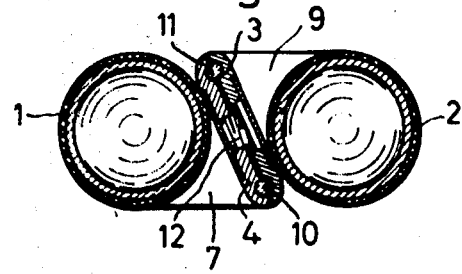
Fig. 8
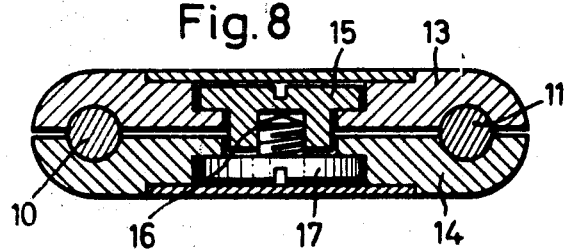
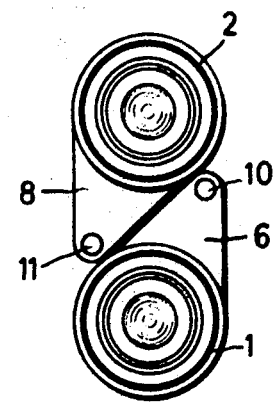
Fig. 6

BINOCULAR FIELD GLASS WITH DOUBLE JOINT

This application is a continuation-in-part of my copending patent application, Ser. No. 818,494, filed Apr. 23, 1969, and now abandoned.

The invention relates to binocular field glasses with a double joint bridge.

Binocular field glasses are known which comprise a pair of small parallel telescopes each of which is connected to one end of a bridge in such a manner as to enable the telescopes to be pivoted in relation to the bridge about parallel axes which are spaced from but parallel with the optical axes of the two telescopes. In this way the distance between the optical axes of the telescopes is adjustable to account for different distance between the eyes of the users and the telescopes may also be folded in against one of the sides of the bridge or against opposite sides of the bridge to thereby achieve a compact shape of the field glasses for storage and carrying purposes.

In binocular field glasses of this kind it is extremely important that the axes of the joints at the ends of the bridge in any pivotal position of the telescopes are accurately parallel with each other and also with the optical axes of the telescopes. A deviation of even as little as one-sixtieth of a degree between any two of the four axes referred to may be very detrimental to the viewing qualities of the instrument. Various suggestions for ensuring such accurate parallelism under all circumstances have been made but none has been entirely satisfactory. None has resulted in a durable precision instrument capable of being manufactured at a reasonable cost and therefore field glasses of this kind have not been widely used in the past.

Accordingly, it is an object of this invention to provide binocular field glasses of the kind indicated which are true precision instruments and at the same time capable of being manufactured at a reasonable cost.

Another object of the invention is to provide a precision instrument of the kind indicated in which the bridge connecting the telescope is composed of two members each having a substantially flat surface parallel with a plane which includes the two axes of the joints at the ends of the bridge, said members being slightly spaced from each other by pivot pins in recesses in said flat surfaces and held together by adjustable clamping means midway between the joints.

A further object of the invention is to provide a precision instrument of the kind indicated in which each of said joints includes a pivot pin secured to arms projecting laterally from the adjacent telescope, each of said pivot pins being journaled in two matching recesses in said two opposed flat surfaces.

Still another object of the invention is to provide a precision instrument of the kind in which said recesses in each of said bridge members are precision finished in a single operation, thereby permitting the use of pivot pins of small diameter while avoiding inaccuracies which would result from drilling holes of small diameter for the pivot pins through an one-piece bridge. Through adjustment of said clamping means the frictional pressure on the pivot pins may be varied at will. The precision finishing of said recesses in preferably achieved by the use of two spaced and accurately parallel milling tools which in a single operation simultaneously make the two recesses in each of said bridge members. It is also feasible to make said precision finished recesses by the use of accurate extrusion dies.

Other objects and advantages will be evident from the following description of the invention with reference to the accompanying drawings, in which:

FIG. 1 illustrates a side elevation of an embodiment of the invention in operable position, FIG. 2 illustrates a front view of said embodiment seen from the eyepiece end of the field glasses, FIG. 3 illustrates a side elevation of the same embodiment in a folded condition, FIG. 4 is a cross-sectional view along the line IV—IV of FIG. 3, FIG. 5 illustrates an end elevation of the field glasses in a folded condition, FIG. 6 illustrates a top view of the field glasses in a folded condition, FIG. 7 is an enlarged cross-sectional view of one form of the split bridge, and FIG. 8 is an enlarged cross-sectional view of another form of the split bridge.

In the drawings, reference numerals 1 and 2 designate the two tubes of the field glasses which are interconnected by a bridge 5 comprising two flat members 3 and 4. Reference numerals 6, 7, 8 and 9 designate lateral projections on the tubes which are axially spaced along the same. Reference numerals 10 and 11 designate pins which are fixedly inserted with their ends in holes provided in these projections as by press fit or knurling of the ends.

The flat bridge members 3 and 4 are provided on their opposed faces with substantially semicylindrical recesses for the pins, said recesses being of such a depth that after insertion of the pins 10, 11 the flat surfaces of the bridge members will be slightly spaced from each other. They are held together by means of a screw 12 which is tightened to such an extent that a certain predeterminable frictional bearing pressure will be exerted on the pins. The bearing pressures and hence the created friction are necessarily equally great at both ends of the bridge because the screw 12 is disposed at the center of the members 3 and 4.

FIG. 7 shows a screw 12 resting with its head on a counterbore provided in the member 3 of the bridge and threadedly engaging the member 4 due to the threads provided therein. In this embodiment the members 3, 4 are dissimilar because one has the counterbore and the other has the threaded bore.

In FIG. 8 the two bridge members 13, 14 are identical in that bolt 15 has internal threads 16 engaged by an exterior thread on a screw 17 which is carried in the bridge member 14. As shown in FIGS. 7 and 8, cover plates are fitted substantially flush with the outside surface of the bridge members to conceal the threaded connectors. As particularly shown in FIGS. 3, 4 and 6, the field glasses can be folded to form a Z so that an optimally flat form of the collapsed field glasses will be obtained.

What I claim is:

1. In a binocular field glass, two small telescopes having parallel optical axes, a pair of laterally projecting arms on each of said telescopes, each said pair of arms being spaced from each other longitudinally of the respective telescope, a cylindrical pivot pin interconnecting each said pair of arms and having its pivot axis parallel with said optical axes of the telescopes, and a bridge having its opposite ends pivotally secured to said pivot pins, said bridge comprising two identical bridge members, substantially flat opposed surfaces on said bridge members parallel with a plane through the longitudinal axes of said pivot pins, a pair of facing precision finished recesses in said opposite surfaces adjacent each end of said bridge members shaped to accurately fit said pivot pins, the two recesses in each bridge member being precision finished to identical dimensions simultaneously in a single operation, and each of said recesses engaging the respective pivot pin on a surface that is slightly less than semicylindrical whereby said opposed surfaces of the bridge members are spaced a short distance from each other, adjustable clamping means midway between said pivot pins adapted to clamp said bridge members to each other with adjustable force whereby the frictional engagement between waid recesses and pivot pins is automatically balanced, said bridge members each having a centered counterbored aperture to receive said clamping means, said clamping means comprising two elements having identical head portions received in the counterbores and having external and internal threaded portions, respectively, said head portions being concealed by cover plates substantially flush with the outside surface of said bridge members, and said pairs of laterally projecting arms being of substantially triangular shape to enable compact folding of said binocular field glass in Z configuration, with respective side edges of said triangular arms adjacent each other.